United States Patent
Renke et al.

(10) Patent No.: US 7,062,880 B2
(45) Date of Patent: Jun. 20, 2006

(54) STABILIZER CLIP FOR WINDOW ASSEMBLY

(75) Inventors: David Thomas Renke, Macomb, MI (US); Charles M Fobare, Imlay City, MI (US); James Crawford Vallance, Farmington Hills, MI (US)

(73) Assignee: General Motors Corporation, Detroit, MI (US)

( * ) Notice: Subject to any disclaimer, the term of this patent is extended or adjusted under 35 U.S.C. 154(b) by 158 days.

(21) Appl. No.: 10/273,716

(22) Filed: Oct. 19, 2002

(65) Prior Publication Data

US 2004/0074169 A1    Apr. 22, 2004

(51) Int. Cl.
*E05D 13/00*    (2006.01)
(52) U.S. Cl. .......................................... 49/414; 49/416
(58) Field of Classification Search .................. 49/415, 49/414, 428, 416; 52/204.61, 716.8, 716.5, 52/716.6, 716.7, 204.53, 204.63, 204.64, 52/204.69, 204.7; 428/31; 293/1; 296/191
See application file for complete search history.

(56) References Cited

U.S. PATENT DOCUMENTS

| | | | | |
|---|---|---|---|---|
| 2,132,104 A | * | 10/1938 | Froeliger | 49/415 |
| 3,385,000 A | * | 5/1968 | Sturtevant et al. | 49/440 |
| 3,401,075 A | * | 9/1968 | Jackson | 428/90 |
| 3,807,978 A | * | 4/1974 | Niemanns | 49/441 |
| 4,430,374 A | * | 2/1984 | Ezaki | 428/135 |
| 4,454,687 A | * | 6/1984 | Baker | 49/419 |
| 4,663,888 A | * | 5/1987 | Okamoto | 49/441 |
| 4,809,463 A | * | 3/1989 | Schroder et al. | 49/377 |
| 5,365,698 A | * | 11/1994 | Nozaki | 49/441 |
| 5,524,388 A | * | 6/1996 | Chowdhury et al. | 49/374 |
| 6,079,159 A | * | 6/2000 | Leonardi | 49/415 |
| 6,305,125 B1 | * | 10/2001 | Nozaki et al. | 49/416 |
| 6,430,878 B1 | * | 8/2002 | Terasawa et al. | 49/416 |

* cited by examiner

*Primary Examiner*—Peter M. Cuomo
*Assistant Examiner*—Sarah B. McPartlin
(74) *Attorney, Agent, or Firm*—Laura C. Hargitt

(57) ABSTRACT

A stabilizer clip for a window assembly clip includes a clip body having a generally U-shaped profile. The clip body is preferably sized to be retained in a windowpane run channel assembly. The clip body defines a groove between opposed side walls for slidably receiving an edge of a windowpane. A plurality of pads extends outwardly from the walls. The pads are adapted to slidably engage the windowpane. When the clip body is retained in the windowpane run channel assembly by a mounting means and the windowpane is in an extended position, the pads engage with the windowpane to prevent lateral movement of the windowpane relative to the windowpane run channel assembly.

5 Claims, 2 Drawing Sheets

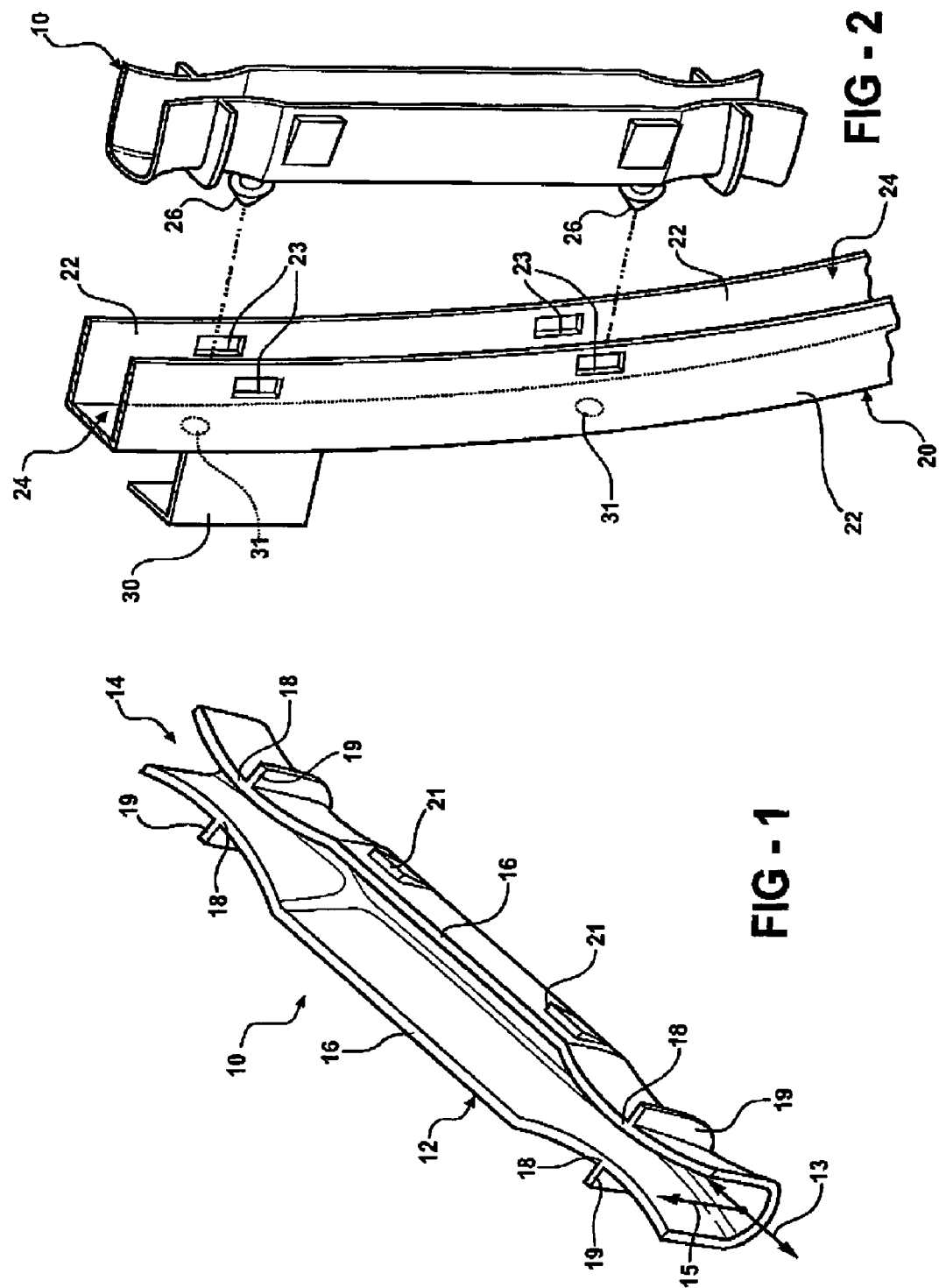

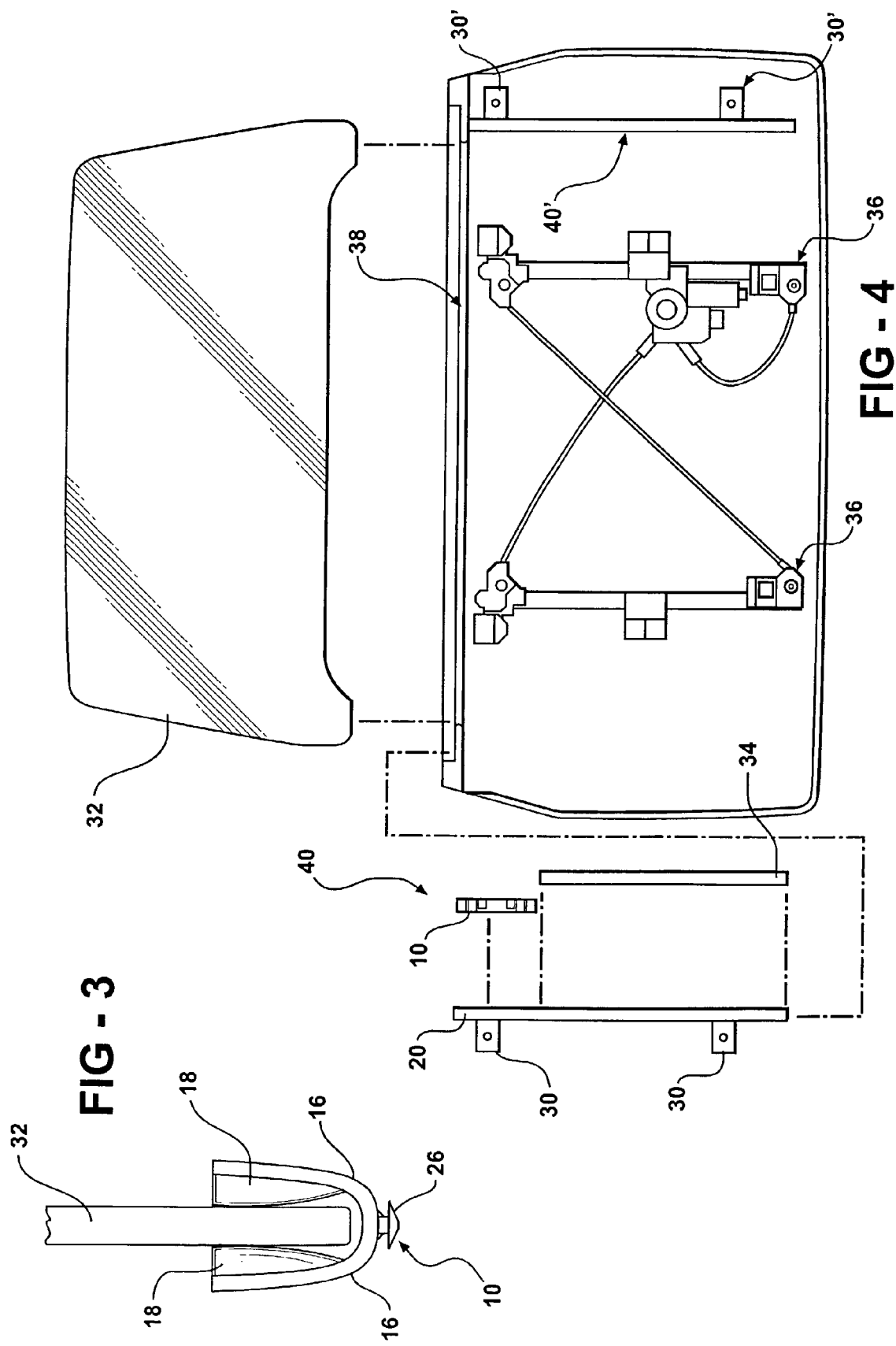

STABILIZER CLIP FOR WINDOW ASSEMBLY

BACKGROUND OF THE INVENTION

The present invention relates generally to automotive window assemblies and actuators and, in particular, to a stabilizer clip for a window assembly.

Window actuators, such as those for automobile window assemblies, are well known. Automotive window actuators have evolved from manual actuators operated by rotary hand cranks to power actuators operated by pushbuttons and electric motors. Window actuators typically utilize devices, known in the art as window regulators, to lift and lower the glass windowpane between an upper closed position and a lower opened position along parallel, spaced apart elongated guide rails. The window regulator is typically disposed within an automobile door, lift gate, or the like.

In many window regulator and door assemblies, the windowpane travels along the guide rails in a path defined by vertical window frames and a horizontal upper header. The window frames and header also aid in aligning and supporting the windowpane within the door when the window and door assembly is being built. In other types of window assemblies, known in the art as "headerless" assemblies, the windowpane does not travel in a path defined by a window frame or a header because there is no frame or header around the periphery of the glass. This is typical of lift gates or windows in automobiles having convertible roofs and hardtops. When the door is open and the windowpane is in an up position, a person may push on the windowpane to close the door or lift gate. Prior art headerless glass assemblies, however, do not provide stiffness to the windowpane, and the windowpane deflects or moves laterally when the person pushes on the windowpane. This excessive lateral deflection by the windowpane does not provide a "quality feel" for the person.

It is desirable, therefore, to provide a headerless window assembly for that has increased stiffness and reduced lateral deflection of the windowpane in order for the window assembly to have a quality feel when a person pushes on the windowpane to close an open door or lift gate.

SUMMARY OF THE INVENTION

The present invention concerns a stabilizer clip for a window operating assembly. The stabilizer clip is preferably adapted to be used with a headerless window assembly. The window assembly is operable to move a frameless windowpane between a retracted position and an extended position. The stabilizer clip includes a clip body having a generally U-shaped profile and is sized to be retained in a windowpane run channel assembly. The clip body defines a groove between opposed side walls for slidably receiving an edge of the windowpane. A plurality of pads, which are adapted to slidably engage the windowpane, extend from the walls. The stabilizer clip also includes a mounting means on the clip body for attaching the clip body to the windowpane run channel assembly. When the clip body is retained in the windowpane run channel assembly by the mounting means and the windowpane is in an extended position, the pads engage with the windowpane to prevent lateral movement of the windowpane relative to the windowpane run channel assembly.

The stabilizer clip in accordance with the present invention advantageously provides stiffness to the glass system when the glass is in the full up or near full up position. The stabilizer clip is preferably part of the glass run channel assembly and can be formed from acetal, nylon, or other suitable plastic material that is compatible with moving glass. The stabilizer clip is preferably located near an upper portion of the glass run channel to engage the glass in the full up position.

The stabilizer clip in accordance with the present invention advantageously provides stiffness to the glass window assembly when closing the door or end gate and minimizes the loading to the window regulator and assembly while still providing glass stability. The user will advantageously "feel" a stiffer glass system when the end gate or the door is open and is moved or closed by pushing on the windowpane.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is a perspective view of a glass stabilizer clip in accordance with the present invention;

FIG. 2 is perspective view of the glass stabilizer clip of FIG. 1 shown with a windowpane run channel;

FIG. 3 is an end view of the glass stabilizer clip in FIG. 2 shown with a windowpane; and FIG. 4 is an exploded side view of the stabilizer clip in accordance with the present invention shown with a windowpane run channel assembly, a window regulator assembly, and a body panel.

DESCRIPTION OF THE PREFERRED EMBODIMENT

Referring now to FIG. 1, a glass guidance and stabilizer clip in accordance with the present invention is indicated generally at 10. The clip 10 includes a clip body 12 having a generally U-shaped profile having a longitudinal axis 13 and a lateral axis 15. The clip body 12 can be formed from acetal, nylon, or other suitable plastic material that is compatible with moving glass, discussed in more detail below. The clip body 12 is preferably sized to be retained in a windowpane run channel assembly (not shown). The clip body 12 defines a groove 14 between opposed side walls 16 for slidably receiving an edge of a windowpane (not shown). The side walls 16 include a plurality of glass contact areas or pads 18 that bow inwardly from the side walls 16 for slidably engaging the windowpane. A rib member 19 is formed on an outer surface of each of the pads 18 to support the pads 18 when the windowpane is slidably engaged therein. An other edge of the rib member 19 is shaped to conform to an outer surface of the non-bowed portions of the side walls 16. A plurality of tab members 21 extend outwardly from an outer surface of the side walls 16 intermediate the contact areas 18 for attaching to a windowpane run channel (not shown), discussed in more detail below.

Referring now to FIGS. 2 and 3, the clip 10 is shown with a windowpane run channel 20. The windowpane run channel 20 is generally C-shaped having opposed side walls 22 that define an opening 24 therebetween. The clip 10 is adapted to be mounted to an upper portion of the channel 20 in the opening 24 by a mounting means 26, such as plurality of spring-loaded clips, that mate with a corresponding mounting hole 31 in the windowpane run channel 20. Each of the tab members 21 mates with a corresponding mounting hole 23 in the side walls 22. At least one bracket 30 and a plurality of fasteners (not shown) including, but not limited to, rivets, screws, or the like are adapted to attach the windowpane run channel 20 to a door frame (not shown). The clip 10 is mounted to the upper portion of the windowpane run channel 20 with the groove 14 facing outwards in order to receive the edge of a windowpane 32, best seen in FIG. 3.

Referring now to FIG. 4, the clip 10 and the windowpane run channel 20, and the windowpane 32 are shown in an exploded view with a seal 34, a window regulator assembly 36, and a door system or closure assembly 38, such as a vehicle door or a vehicle end gate. The seal 34 is adapted to be mounted to a lower portion of the windowpane run channel 20 adjacent the clip 10. The clip 10, the windowpane run channel 20, and the seal 34 are combined to form a windowpane run channel assembly indicated generally at 40. The windowpane run channel assembly 40 is then attached to the closure assembly 38 outboard of the window regulator assembly 36 by the mounting brackets 30 extending from an exterior portion of the windowpane run channel 20. An assembled windowpane run channel assembly 40' is shown attached to the closure assembly 38 by fasteners (not shown) attached to corresponding mounting brackets 30'.

The window regulator assembly 36 is attached to an inner surface of the closure assembly 38. The window regulator assembly 36 is operable to move the frameless windowpane 32 between a retracted position (not shown) and an extended position (not shown). The retracted position corresponds to an open windowpane down position where the windowpane 32 is enclosed behind the closure assembly 38 and the extended position corresponds to a closed windowpane up position where the windowpane 32 extends at its full length beyond an upper portion of the closure assembly 38.

In operation, when the clip body 10 is retained in the windowpane run channel assembly 40 by the mounting means 26 or 30 and the windowpane 32 is in an extended position, the pads 18 engage with the windowpane 32 to prevent lateral movement of the windowpane 32 relative to the windowpane run channel assembly 40.

The glass stabilizer clip 10 in accordance with the present invention is symmetric about its longitudinal axis, which acts as an assembly aid because the stabilizer clip 10 cannot be installed backwards, upside down, or inverted. This advantageously allows for quicker, "error-proof" assembly of the stabilizer clip 10 and the windowpane run channel assembly 40.

The stabilizer clip 10 in accordance with the present invention advantageously provides stiffness to the windowpane run channel assembly 40 when closing the closure assembly 38 and minimizes the loading to the window regulator assembly 36 and windowpane run channel assembly 40 while still providing stability to the glass windowpane 32. The user will advantageously feel a stiffer glass system when the door or the end gate is open and is moved or closed by pushing on the windowpane 32.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A windowpane run channel assembly for use with a vehicle window operating assembly operable to move a windowpane in a frameless window vehicle door between a retracted position and an extended position, said windowpane run channel assembly comprising:

a windowpane run channel; and a clip body having a generally U-shaped profile and attached to said windowpane run channel by a mounting member, said clip body including a pair of opposed generally upstanding side walls defining a groove therebetween for slidably receiving an edge of a windowpane; along a length of said side walls, said side walls sweep inboard relative to a longitudinal axis of said clip body to define at least a pair of inwardly bowed side wall portions for slidably engaging the windowpane along at least a line of contact parallel to a lateral axis of tile clip body, and the clip body including a rib member extending from an outer surface of each of said inwardly bowed portions of said walls, with each of said rib members extending outwardly into contact with said windowpane run channel to support said inwardly bowed portions of said walls when the windowpane is slidably engaged therein;

whereby when the windowpane is in an extended position, said inwardly bowed side wall portions of said walls engage with the windowpane to reduce lateral movement of the windowpane relative to said windowpane run channel; and a seal retained in a lower portion of said windowpane run channel and wherein said clip body is retained in an upper portion of said windowpane run channel adjacent said seal, said lower and upper portions of said windowpane run channel being integral.

2. The windowpane run channel assembly according to claim 1 wherein said clip body is formed from acetal or nylon.

3. A windowpane run channel assembly for use with a vehicle window operating assembly operable to move a windowpane in a frameless window vehicle door between a retracted position and an extended position, said windowpane run channel assembly comprising:

a windowpane run channel; and a clip body having a generally U-shaped profile and attached to said windowpane run channel by a mounting member, said clip body including a pair of opposed generally upstanding side walls defining a groove therebetween for slidably receiving an edge of a windowpane; along a length of said side walls, said side walls sweep inboard relative to a longitudinal axis of said clip body to define at least a pair of inwardly bowed side wall portions for slidably engaging the windowpane along at least a line of contact parallel to a lateral axis of the clip body, and the clip body including a rib member extending from an outer surface of each of said inwardly bowed portions of said walls, with each of said rib members extending outwardly into contact with said windowpane run channel to support said inwardly bowed portions of said walls when the windowpane is slidably engaged therein;

whereby when the windowpane is in an extended position, said inwardly bowed side wall portions of said walls engage with the windowpane to reduce lateral movement of the windowpane relative to said windowpane run channel; and a tab member extending outwardly from each of said walls, each said tab member engaging with a corresponding mounting hole formed in said windowpane run channel.

4. A stabilizer clip for use with a vehicle window operating assembly operable to move a windowpane in a frameless window vehicle door between a retracted position and an extended position, said stabilizer clip comprising:

a clip body having a generally U-shaped profile and sized to be retained in a windowpane run channel assembly, said clip body including a pair of opposed generally upstanding side walls defining a groove therebetween for slidably receiving an edge of a windowpane; along a length of said side walls, said side walls sweep inboard twice relative to a longitudinal axis of said clip body to define two pair of inwardly bowed side wall portions for slidably engaging the windowpane along at least a line of contact parallel to a lateral axis of the clip body, with a first pair of said two pair of inwardly bowed side wall portions being spaced from a second pair of said two pair of inwardly bowed side wall portions; and mounting means on said clip body for attaching said clip body to the windowpane run channel assembly, whereby when said clip body is retained in the windowpane run channel assembly by said mounting means and when the windowpane is in an extended position, said inwardly bowed side wall portions of said walls engage with the windowpane to reduce lateral movement of the windowpane relative to the windowpane run channel assembly; and at least one tab member extending outwardly from each of said walls, each said at least one tab member for engaging with a corresponding mounting hole formed in said windowpane run channel.

5. A windowpane run channel assembly for use with a vehicle window operating assembly operable to move a windowpane in a frameless window vehicle door between a retracted position and an extended position, said windowpane run channel assembly comprising:

a windowpane run channel; and a clip body having a generally U-shaped profile and attached to said windowpane run channel by a mounting member, said clip body including a pair of opposed generally upstanding side walls defining a groove therebetween for slidably receiving an edge of a windowpane: along a length of said side walls, said side walls sweep inboard relative to a longitudinal axis of said clip body to define at least a pair of inwardly bowed side wall portions for slidably engaging the windowpane along at least a line of contact parallel to a lateral axis of the clip body, and the clip body including a rib member extending from an outer surface of each of said inwardly bowed portions of said walls, with each of said rib members extending outwardly into contact with said windowpane run channel to support said inwardly bowed portions of said walls when the windowpane is slidably engaged therein;

whereby when the windowpane is in an extended position, said inwardly bowed side wall portions of said walls engage with the windowpane to reduce lateral movement of the windowpane relative to said windowpane run channel; and at least one tab member extending outwardly from each of said walls, each said at least one tab member engaging with a corresponding mounting hole formed in said windowpane run channel.

\* \* \* \* \*